US008407206B2

(12) United States Patent
Proebsting et al.

(10) Patent No.: US 8,407,206 B2
(45) Date of Patent: *Mar. 26, 2013

(54) STORING RESULTS RELATED TO REQUESTS FOR SOFTWARE DEVELOPMENT SERVICES

(75) Inventors: Todd A. Proebsting, Redmond, WA (US); David R. Hanson, Redmond, WA (US); Benjamin G. Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1165 days.

This patent is subject to a terminal disclaimer.

(21) Appl. No.: 11/131,455

(22) Filed: May 16, 2005

(65) Prior Publication Data

US 2007/0006120 A1  Jan. 4, 2007

(51) Int. Cl.
*G06F 17/30* (2006.01)
(52) U.S. Cl. .......................... 707/713; 707/637; 707/764
(58) Field of Classification Search ................. 717/101, 717/126, 161, 158; 707/2, 999.2, 802, 637, 707/764, 713
See application file for complete search history.

(56) References Cited

U.S. PATENT DOCUMENTS

| | | | | | |
|---|---|---|---|---|---|
| 4,999,766 | A | * | 3/1991 | Peters et al. | 707/10 |
| 5,175,856 | A | * | 12/1992 | Van Dyke et al. | 717/151 |
| 5,179,702 | A | * | 1/1993 | Spix et al. | 718/102 |
| 5,301,327 | A | * | 4/1994 | McKeeman et al. | 717/145 |
| 5,325,531 | A | * | 6/1994 | McKeeman et al. | 717/145 |
| 5,377,323 | A | * | 12/1994 | Vasudevan | 709/226 |
| 5,499,357 | A | * | 3/1996 | Sonty et al. | 710/104 |
| 5,583,983 | A | * | 12/1996 | Schmitter | 717/138 |
| 5,717,860 | A | * | 2/1998 | Graber et al. | 709/227 |
| 5,764,906 | A | * | 6/1998 | Edelstein et al. | 709/219 |
| 5,764,989 | A | * | 6/1998 | Gustafsson et al. | 717/129 |
| 5,805,889 | A | * | 9/1998 | Van De Vanter | 717/107 |
| 5,832,274 | A | * | 11/1998 | Cutler et al. | 717/171 |
| 5,835,718 | A | * | 11/1998 | Blewett | 709/218 |
| 5,864,837 | A | * | 1/1999 | Maimone | 707/1 |

(Continued)

FOREIGN PATENT DOCUMENTS

EP  1-124-183 A1 * 8/2001
WO  WO 97/00475 * 1/1997

(Continued)

OTHER PUBLICATIONS

Heydon et al. "The Vesta Approach to Software Configuration Management", Mar. 9, 2001 Compaq Systems Research Center Technical Note.*

(Continued)

*Primary Examiner* — Baoquoc N To
(74) *Attorney, Agent, or Firm* — Klarquist Sparkman, LLP

(57) ABSTRACT

Described herein are methods and systems for providing software development services more efficiently. Re-computation of results each time a service request is received can be avoided by maintaining a cache of results from having processed requests. Results are stored under a unique mapping of request-results pairs that at least in part rely on a file fingerprint hash of the contents of the input files related to the request. In network environment with a client requester and service provider unnecessary transmission is also avoided by first presenting results for requests are in form of a unique file identifier identifying one or more files holding the content of the results. The file identifier is used to search a cache local to the requesting client prior to requesting transmission of the results. The file identifier may also include an indicator for indicating a location from which the results may be retrieved.

16 Claims, 10 Drawing Sheets

U.S. PATENT DOCUMENTS

| | | | | |
|---|---|---|---|---|
| 5,864,852 | A * | 1/1999 | Luotonen | 726/14 |
| 5,893,118 | A * | 4/1999 | Sonderegger | 707/203 |
| 5,907,709 | A * | 5/1999 | Cantey et al. | 717/141 |
| 5,920,868 | A * | 7/1999 | Fowlow et al. | 1/1 |
| 6,026,405 | A * | 2/2000 | Arda et al. | 707/10 |
| 6,112,024 | A * | 8/2000 | Almond et al. | 717/122 |
| 6,119,153 | A * | 9/2000 | Dujari et al. | 709/218 |
| 6,141,791 | A * | 10/2000 | Takuma et al. | 717/125 |
| 6,195,676 | B1 * | 2/2001 | Spix et al. | 718/107 |
| 6,216,162 | B1 * | 4/2001 | Dutcher et al. | 709/226 |
| 6,292,802 | B1 * | 9/2001 | Kessenich et al. | 707/101 |
| 6,324,685 | B1 * | 11/2001 | Balassanian | 717/118 |
| 6,360,215 | B1 * | 3/2002 | Judd et al. | 707/3 |
| 6,401,099 | B1 * | 6/2002 | Koppolu et al. | 707/103 R |
| 6,499,137 | B1 * | 12/2002 | Hunt | 717/164 |
| 6,609,249 | B2 * | 8/2003 | Kunz et al. | 717/161 |
| 6,757,893 | B1 * | 6/2004 | Haikin | 717/170 |
| 6,804,700 | B1 * | 10/2004 | Terek et al. | 709/203 |
| 6,813,690 | B1 * | 11/2004 | Lango et al. | 711/118 |
| 6,968,332 | B1 * | 11/2005 | Milic-Frayling et al. | 707/723 |
| 7,089,263 | B2 * | 8/2006 | Arnold et al. | 1/1 |
| 7,127,705 | B2 * | 10/2006 | Christfort et al. | 717/113 |
| 7,287,164 | B2 * | 10/2007 | Carro | 713/176 |
| 7,330,863 | B2 * | 2/2008 | Carro | 707/205 |
| 7,340,726 | B1 * | 3/2008 | Chelf et al. | 717/126 |
| 7,340,730 | B2 * | 3/2008 | Arkwright et al. | 717/148 |
| 7,412,039 | B2 * | 8/2008 | Carro | 379/88.13 |
| 7,444,626 | B2 * | 10/2008 | McIntosh et al. | 717/151 |
| 7,480,901 | B2 * | 1/2009 | Arenburg et al. | 717/153 |
| 7,614,040 | B2 * | 11/2009 | Wagner et al. | 717/120 |
| 2002/0133638 | A1 * | 9/2002 | Daynes et al. | 709/315 |
| 2002/0138617 | A1 * | 9/2002 | Christfort et al. | 709/225 |
| 2003/0005093 | A1 * | 1/2003 | Deboer et al. | 709/220 |
| 2003/0005425 | A1 * | 1/2003 | Zee | 717/166 |
| 2003/0023961 | A1 * | 1/2003 | Barsness et al. | 717/152 |
| 2003/0028519 | A1 * | 2/2003 | Burgess | 707/1 |
| 2003/0061278 | A1 * | 3/2003 | Agarwalla et al. | 709/203 |
| 2003/0074394 | A1 * | 4/2003 | Eshghi | 709/203 |
| 2003/0167423 | A1 * | 9/2003 | Murakami et al. | 714/38 |
| 2004/0010543 | A1 * | 1/2004 | Grobman | 709/203 |
| 2004/0054906 | A1 * | 3/2004 | Carro | 713/171 |
| 2004/0143825 | A1 * | 7/2004 | Hicks | 717/145 |
| 2005/0091580 | A1 * | 4/2005 | Kamholz et al. | 715/513 |
| 2005/0131905 | A1 * | 6/2005 | Margolus et al. | 707/10 |
| 2005/0187902 | A1 * | 8/2005 | Carpentier et al. | 707/1 |
| 2005/0193031 | A1 * | 9/2005 | Midgley et al. | 707/200 |
| 2005/0216444 | A1 * | 9/2005 | Ritter et al. | 707/3 |
| 2005/0216486 | A1 * | 9/2005 | Barshefsky et al. | 707/100 |
| 2005/0238147 | A1 * | 10/2005 | Carro | 379/88.13 |
| 2005/0262189 | A1 * | 11/2005 | Mamou et al. | 709/203 |
| 2005/0262482 | A1 * | 11/2005 | Wagner et al. | 717/120 |
| 2005/0283464 | A1 * | 12/2005 | Allsup et al. | 707/3 |
| 2006/0101443 | A1 * | 5/2006 | Nasr | 717/163 |
| 2006/0117182 | A1 * | 6/2006 | Wolff | 713/176 |
| 2006/0236310 | A1 * | 10/2006 | Domeika et al. | 717/140 |
| 2006/0259897 | A1 * | 11/2006 | Zorn et al. | 717/118 |

FOREIGN PATENT DOCUMENTS

WO    WO 2004/049199 A2 *   6/2004

OTHER PUBLICATIONS

Sayers, Craig, et al., "The Case for Generating URIs by Hashing RDF Content", HPL-2002-216, Hewlett-Packard Co., © 2002, pp. 1-13.*

Levy, Eliezer, et al., "Distributed File Systems: Concepts and Examples", ACM Computing Surveys, vol. 22, No. 4, Dec. 1990, pp. 321-374.*

Mitra, Arindam, et al., "Wide-Area Content-Based Routing Mechanism", IPDPS '03, Apr. 22-26, 2003, pp. 1-8.*

Hollingsworth, Jeffrey K., et al., "Binary Version Management for Computational Grids", Parallel Processing Letters, vol. 9 No. 2, © 1999, pp. 215-225.*

Hardy, Darren R., et al., "Essence: A Resource Discovery System Based on Semantic File Indexing", USENIX, San Diego, CA, Jan. 25-29, 1993, pp. 361-374.*

Berchtold, Stefan, et al., "SaveMe: a System for Archiving Electronic Documents Using Messaging Groupware", WACC '99, San Francisco, CA, © 1999, pp. 167-176.*

Hollingsworth, Jeffrey K., et al., "Using Content-Derived Names for Configuration Management", SSR '97, © 1997, pp. 104-109.*

Hollingsworth, Jeffrey K., et al., "Using Content-Derived Names for Caching and Software Distribution", Proc. of the 1997 ACM Symposium on Software Reusability, © 1997, pp. i-ii and 1-12.*

Peery, Christopher, et al., "Wayfinder: Navigating and Sharing Information in a Decentralized World", DBISP2P 2004, LNCS 3367, Springer-Verlag, Berlin, Germany, Feb. 25, 2005, pp. 200-214.*

Hartman, John J., et al., "Joust: A Platform for Liquid Software", IEEE Computer, vol. 32, Issue 4, Apr. 1999, pp. 50-56.*

Collberg, Christian S., et al., "AλgoVista—A Search Engine for Computer Scientists", Univ. of Arizona Technical Report No. 2000-01, Microsoft Research Technical Report No. MSR-TR-2000-06, Jan. 27, 2000, pp. i and 1-19.*

Hartman, John, et al., "Liquid Software: A New Paradigm for Networked Systems", Univ. of Arizona Technical Report No. TR 96-11, © 1996, pp. i and 1-13.*

Hartman, John, et al., "Experiences Building a Communication-Oriented JavaOS", Software: Practice and Experience, vol. 30, Issue 10, Jul. 6, 2000, pp. 1107-1126.*

Walpole, J., et al., "A Unifying Model for Consistent Distributed Software Development Environments", © 1998 ACM 0-89791-290-X/88/0011/0183, pp. 183-190.*

Čubranić, Davor, et al., "Learning from Project History: A Case Study for Software Development", CSCW '04, Chicago, IL, Nov. 6-10, 2004, pp. 82-91.*

Magnusson, Boris, et al., "Fine-Grained Revision Control for Collaborative Software Development", SIGSOFT '93, Los Angeles, CA, © 1993, pp. 33-41.*

Hart, Richard O., et al., "DEC FUSE: Building a Graphical Software Development Environment from UNIX Tools", Digital Technical Journal, vol. 7, No. 2, © 1995, pp. 5-19.*

Heydon et al., "Caching Function Calls Using Precise Dependencies", 10 pages, Jul. 2006.

Heydon et al., "The Vesta Approach to Software Configuration Management", Compaq Computer Corporation, Research Report, 24 pages, Mar. 2001.

Heydon et al., "The Vesta Approach to Software Configuration Management", Compaq Computer Corporation, Research Report, 221 pages, Jan. 2002.

Schalk, Slides describing Vesta presented at CodeCon 2004, 9 pages.

* cited by examiner

STORING RESULTS RELATED TO REQUESTS FOR SOFTWARE DEVELOPMENT SERVICES

TECHNICAL FIELD

The field relates to software development processes and systems. More particularly, the field relates to providing software development services by avoiding unnecessary computation and data transmissions.

BACKGROUND

The software development processes, including such activities as compiling source code are very familiar to developers and in some ways, have not changed substantially over the last few decades. However, in this same period, computational resources including CPU, memory, network bandwidth, etc. that are available for compilation have increased dramatically, for instance.

As the scale of software development increases and the capabilities of the computational resources improve, in particular the capability to collaborate via network of computers, the view that software development is a desktop-based client-centric activity is being challenged. As large teams need to coordinate activities related to software development, increasingly important parts of the software development process have shifted to a client-server network environment to enable the use of a network of computational resources to process, unify, and coordinate the activities of multiple teams. This need to unify and coordinate software development activities exists even on a stand alone desktop machine. For instance, a developer may use the same desktop machine for software development activities related to the same code but as different projects at different times.

Current solutions that focus on a typical integrated development environment (IDE) (e.g., Visual Studio®, Rational®, etc.) provide limited direct support for unifying and coordinating the various software development activities. As a result, much of the software development work is implemented in an ad hoc manner with each team recreating its own process, and tools, which can lead to numerous mistakes.

A number of problems exist with the current approach to software development. For instance, each time a source file of a software program is processed (e.g., compiled, optimized, analyzed, etc.) during the software development process, it is viewed in isolation. For instance, current compilers do not attempt to understand the relationship between source files compiled today and those compiled yesterday. Likewise, they do not attempt to reason about identical source files submitted during different build processes. As a result, much of the software development activity today is related to wasted re-computation of results that may have been previously processed.

Thus, there is a need for an improved software development model, wherein software development activities, such as compiling, analyzing, and building software can be implemented intelligently by retaining, discovering and re-using results of previous processing. More specifically, there is a need for delivering software development services while avoiding re-computation of previously computed results for service requests and avoiding unnecessary transmission of data over a network, for instance.

SUMMARY

Described herein are methods and systems for providing software development services. In one aspect, software development is implemented on a network of computers more efficiently by avoiding unnecessary re-computation of previously stored results and by avoiding unnecessary transmission of data. In yet another aspect, software developments services are implemented more efficiently on a stand alone computer by avoiding re-computation of previously stored results.

In yet another aspect, requests for software development services are method calls that comprise an identifier of an input file to be processed, at least one specified result of the processing and a specification of at least one software development tool to be used in the requested processing. In one aspect, prior to computing the results for the request, a memory location accessible to the computer servicing the request is searched to determine whether the results for the specific request are stored therein. The results for those requests that are not stored in the cache memory are computed. Results for those requests that were found to be stored in the cache memory are not re-computed. Instead, the stored results are retrieved for re-use.

In another aspect, results are stored in one or more tables indexed based on file identifiers of results comprising at least one file fingerprint of input files specified in the service request. In another aspect, file fingerprints are also generated by generating a hash of at least some portion of the contents of results file. Once stored in this manner, the results can be searched, and based on the strength of the hash, previously computed results can be identified to match current requests to avoid re-computation.

In a further aspect, results for service requests are presented to the requesters in form of a file identifier uniquely identifying the files comprising the results so that the requester can first examine a cache memory location that they are locally associated with for the presence of such results. In this manner, only results not locally available to the requesting developer clients are transmitted over the network. In yet another aspect, input files that are the subject of the software service requests are identified in form of a file identifier. Thus, for instance, requests for services can identify the input files to be processed in form of their file identifiers and the service provider can then use the identifiers to enquire whether these input files are available in a local cache memory and request transmission of those input files determined not to be available locally.

In yet another aspect, the file identifiers comprise not only a content-based hash but also an indicator, such as an universal resource locator, for indicating a storage location that can be accessed to download input files and/or result files, when needed. In this manner, unnecessary transmission of input files and/or result files is avoided.

The foregoing and other objects, features, and advantages of the invention will become more apparent from the following detailed description, which proceeds with reference to the accompanying figures.

DETAILED DESCRIPTION

An Exemplary Overall Method of Providing Software Development Services

Figure 1:
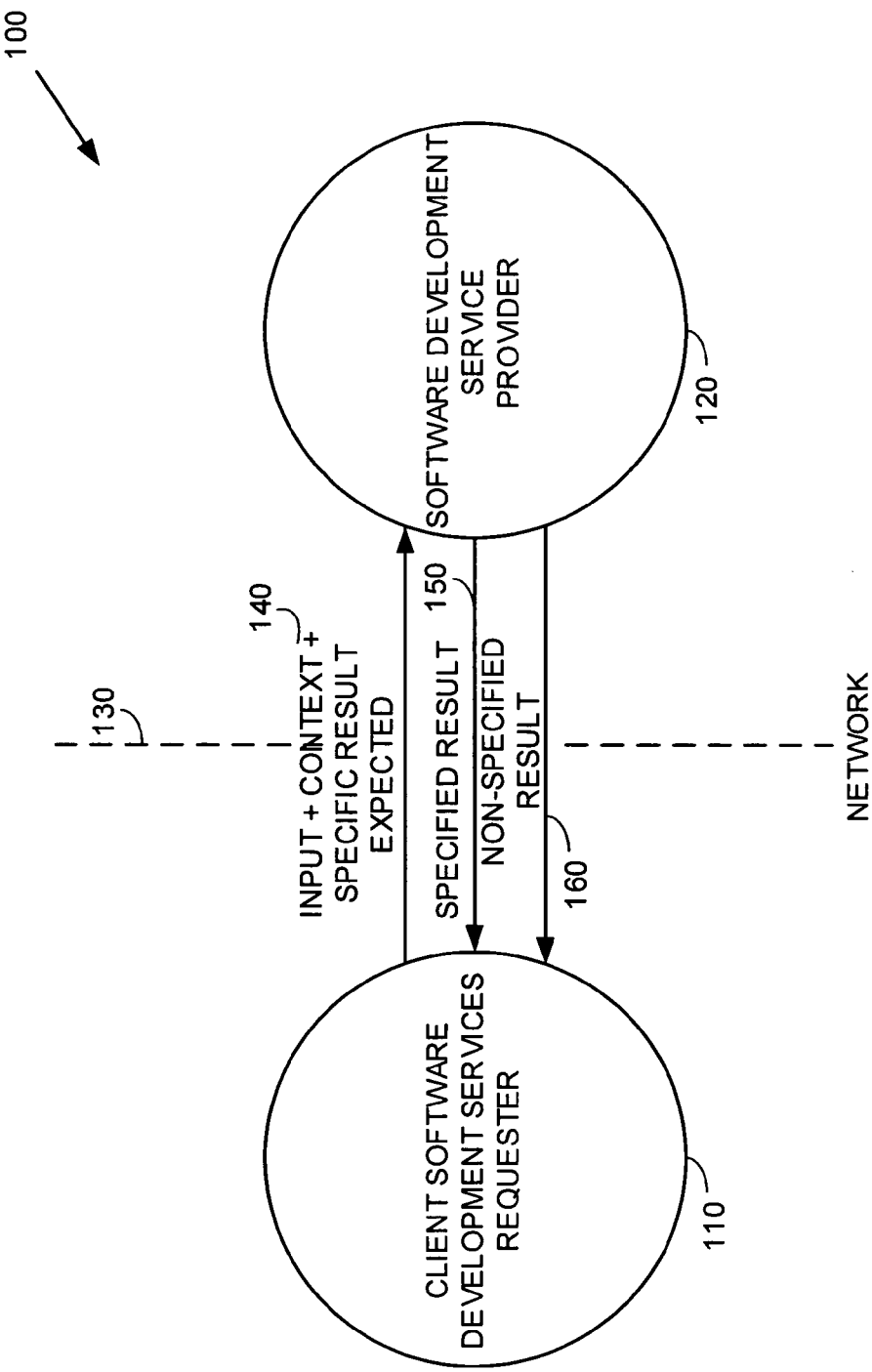
FIG. 1 is a block diagram illustrating an exemplary overall system for providing software development services over a computer network.

FIG. 1 illustrates a framework 100 for software development process (e.g., compilation) that is better suited for maximizing the utility and the capabilities of computational resources in a network environment. For instance, instead of thinking of compilation as a mechanical transformation from a source to an executable on a stand alone desktop computer, the model of FIG. 1 illustrates software development activities including, for instance, compilation as a specific instance of a general query from a client requester 110 (the developer) over the network 130 to a software development service provider 120 (e.g., a compiler). The compilation process is implemented as a request submitted to a software development engine to get back the compiled object code as one of many "hits" or results (e.g. 150).

In FIG. 1, the client submits a request 140 to the software development service provider server 120 (hereafter referred to as a provider server) an input file comprising, for instance, a unit of source code of a program (a main file, a function, classes, etc.) along with whatever execution context is necessary to process the input. The request also specifies an expected result from the processing. Execution context includes but is not limited to specification of the operating system on which to conduct the operation, paths to header files that may be needed, paths to include files, and so on. The expected result specified in a request for compilation service by a software development tool may be a compiled version of the source (e.g., "foo.obj" may be a specified result expected from processing of a "foo.c" input file).

However, there are many different ways in which a source file can be compiled, including, for instance, according to different optimization goals (e.g., optimizing memory, time, etc.). Furthermore, there could be other results of other processing of the input source file related to the request 140 that may also be of interest to the client requester 110. For instance, the software development service provider 120 may apply tools (e.g., analyzers, compilers, optimizers, etc.) that are not specified by the requester 110 in their request 140. In fact, the requesting developer may not even be aware of such possibilities. Thus, in addition to getting the specified result 150, the client requester 110 may also receive one or more results 160 not specified by the requester 110.

Figure 2:
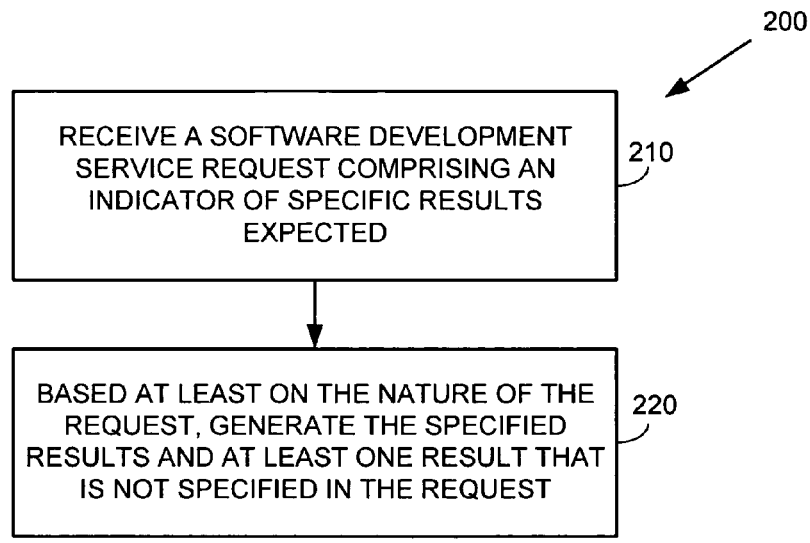
FIG. 2 is a flow diagram describing an exemplary overall method of providing software development services over a computer network.

FIG. 2 describes an overall method 200 of providing such software development services wherein, at 210, the service provider 120 of FIG. 1 receives a software development service request comprising an indication of the result specified 150 by the requester (e.g., 110 in FIG. 1). However, at 220, the service provider returns not only the result specified by the requester 110 of FIG. 1, but at least one other result 160 that is not specified by the requester 110.

In a networked software development environment the service provider 120 has a global view of all the source files being processed by various software development tools associated therewith. For instance, it has a view of many different requests for compiled source code across time and organization. This global view enables many interesting approaches including avoiding duplication of computing results related to the same request and the ability to perform targeted static analysis and optimization based on the history and pattern of requests. A software development service will see the array of requests presented across an organization and with such a global view many economies are possible. For instance, frequent requests and their results can be stored to avoid re-computation. Also, by being aware of the frequent requests, additional optimization and analysis resources can be focused on these most frequent requests. Additional safety analysis, including higher-cost static analysis and additional checks performed by compiler transformations to preserve correctness can be applied to those selected sets of most frequent requests.

Furthermore, the overhead of investigating a new analysis is greatly decreased, because much of the information that would otherwise be distributed is centralized. For example, duplicated code or code that differs in minor ways submitted from multiple sources could be flagged for potential reuse. Code could be globally analyzed for issues related to appropriate content, relation to external code bases, etc.

In addition to avoiding re-computation of results for similar requests, duplication of the efforts related to identifying bugs in code and corresponding fixes too can be avoided. For instance, if changes to the source code to fix bugs are noted by a software development service 120, patches to fix a bug in one variant of a common code base could be made visible to the maintainers of other variants automatically.

Data related to patterns of requests from individual groups can be used to anticipate results needed by the client requester 110. Thus, if a majority of the time (based on some appropriate threshold number), requests from a group involves applying software development tools in the context of 8 different targets and suppose, in one instance, a request from the same group occurs where only 7 targets are specified (for example, because a developer forgot to do one), this kind of departure from noticeable patterns might be flagged by the service provider 120. Thus, one type of result 160 that is an unexpected addition to the result specified by the requester 150 of such an off pattern software development service request may be one wherein the request is processed to apply the software development tool to 8 different targets in addition to the applying the 7 different targets for generating the specified results 150.

Figure 3:
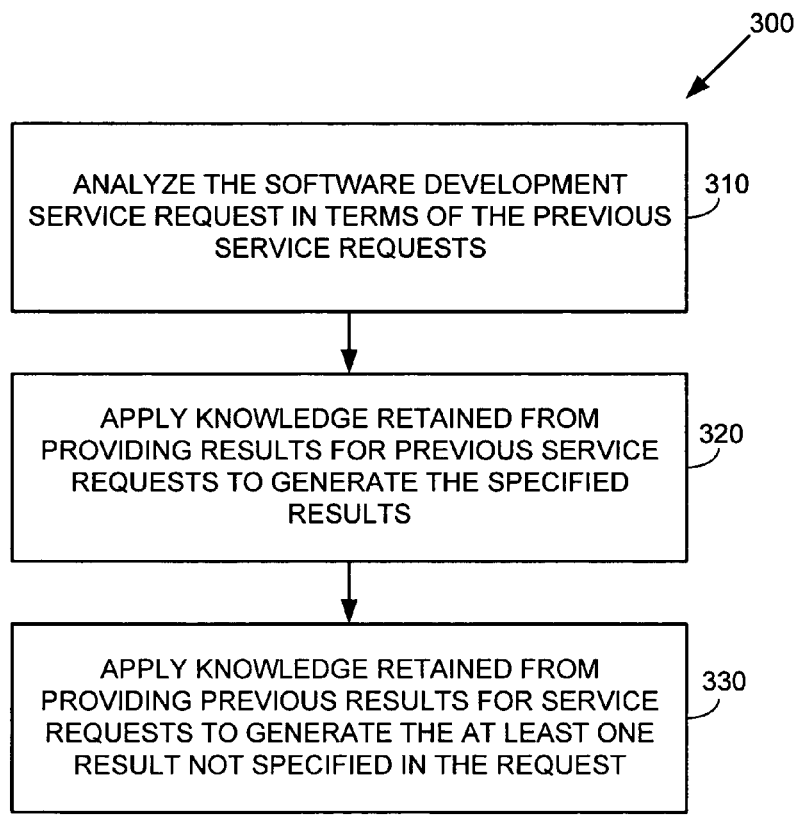
FIG. 3 is a flow diagram describing an exemplary method of providing software development services over a network based on information retained from previous processing of requests for providing the services.

According to the method 300 described with reference to FIG. 3, the software development service provider 120 responds to service requests by a client requester 110 more efficiently by basing the results (e.g., 150 and 160) on results provided previously for similar or related requests from the same requester or another related requester. Accordingly, at 310, the software development service provider 120 analyzes service requests in comparison to previous service requests and thus, the knowledge from previous requests can then be used to provide expected results at 320, as well as unexpected results at 330.

Figure 4:
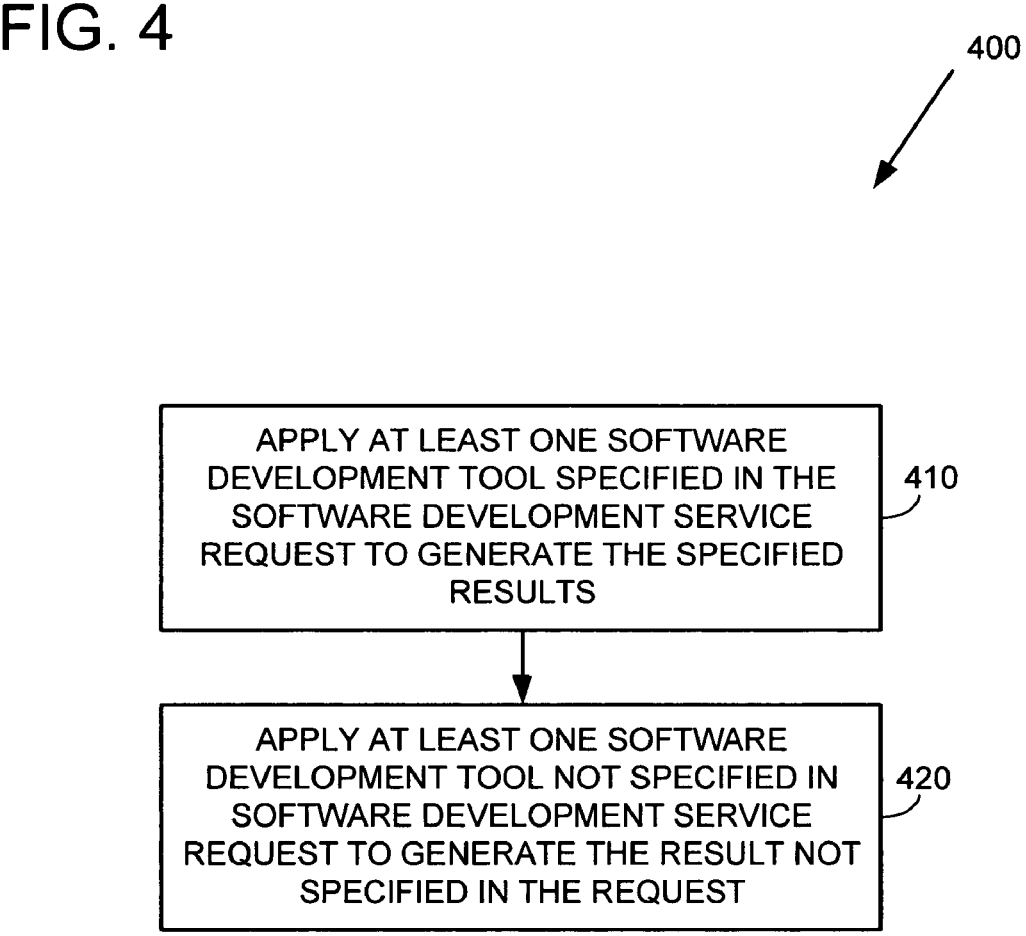
FIG. 4 is a flow diagram describing an exemplary method of providing software development services over a network wherein software development tools not specified by the client service requester are applied to generate at least one unexpected result.

Furthermore, providing software development services in a centralized manner allows new tools and analyses to be made available automatically and in a manner that is transparent to the developers associated with the client requester 110. Improvements to code analyses or code compilation can take place without the knowledge or action on part of the client 110 requesting the service. For instance, the code simulation analysis tool PREfast by Microsoft does not have to be installed on the client 110 for the results of a PREfast analysis to be available to the developer using the client. Going even further, the developer need not even be aware of the PREfast tool to prospectively receive results of its analysis. Thus, according to the method 400 of FIG. 4, software development services are provided by using not only the tools specified in a request at 410 but also using other tools available to services that are not specified in the request, at 420 and one that the developers initiating the request may not even be aware of.

The framework for providing software development services illustrated in FIG. 1 centralizes computational resources in a way that can much more easily benefit from improvements in technology and supports the scalability of software development capabilities. Using a server farm to handle all compilation and program analysis means that individual developer's machines do not require upgrades, etc. when new development software is installed. Likewise, the computational resources needed to support compilation and program analysis are shared and efficiently used within this framework.

Furthermore, with availability of the broader view of a service request as mentioned above, the results generated by the various software development tools (both specified 150 and unspecified 160) could be ranked, just as a search engines rank results of queries. For instance, results of high-value tools could be ranked higher to make such results more likely to be visible to a developer associated with the client requester 110.

An Exemplary System for Providing Software Development Services

Figure 5A:
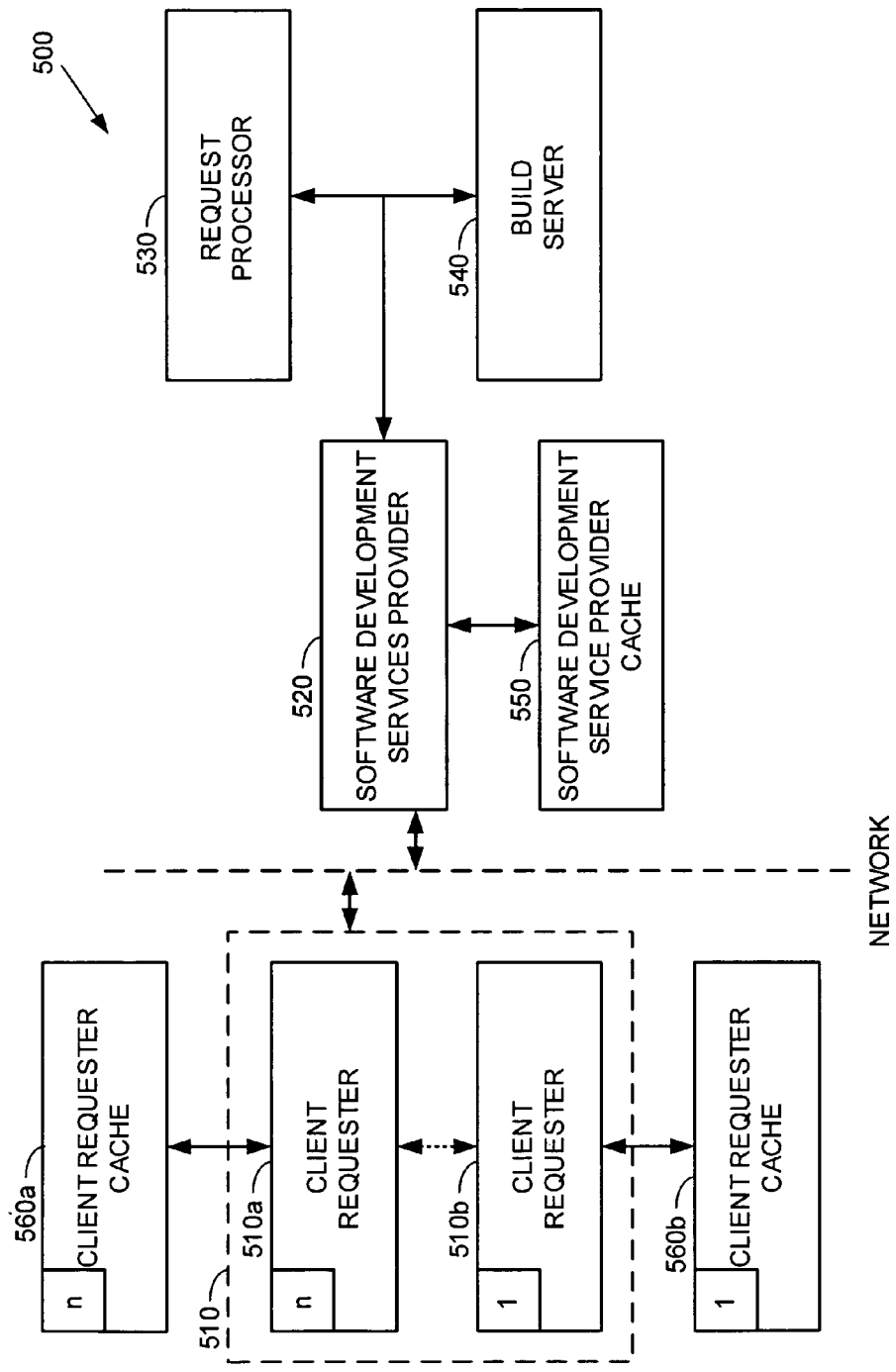
FIG. 5A is a block diagram at least in part illustrating an exemplary system for providing software development services over a network comprising exemplary memory locations for storing input files and files related to processed results.
Figure 5B:
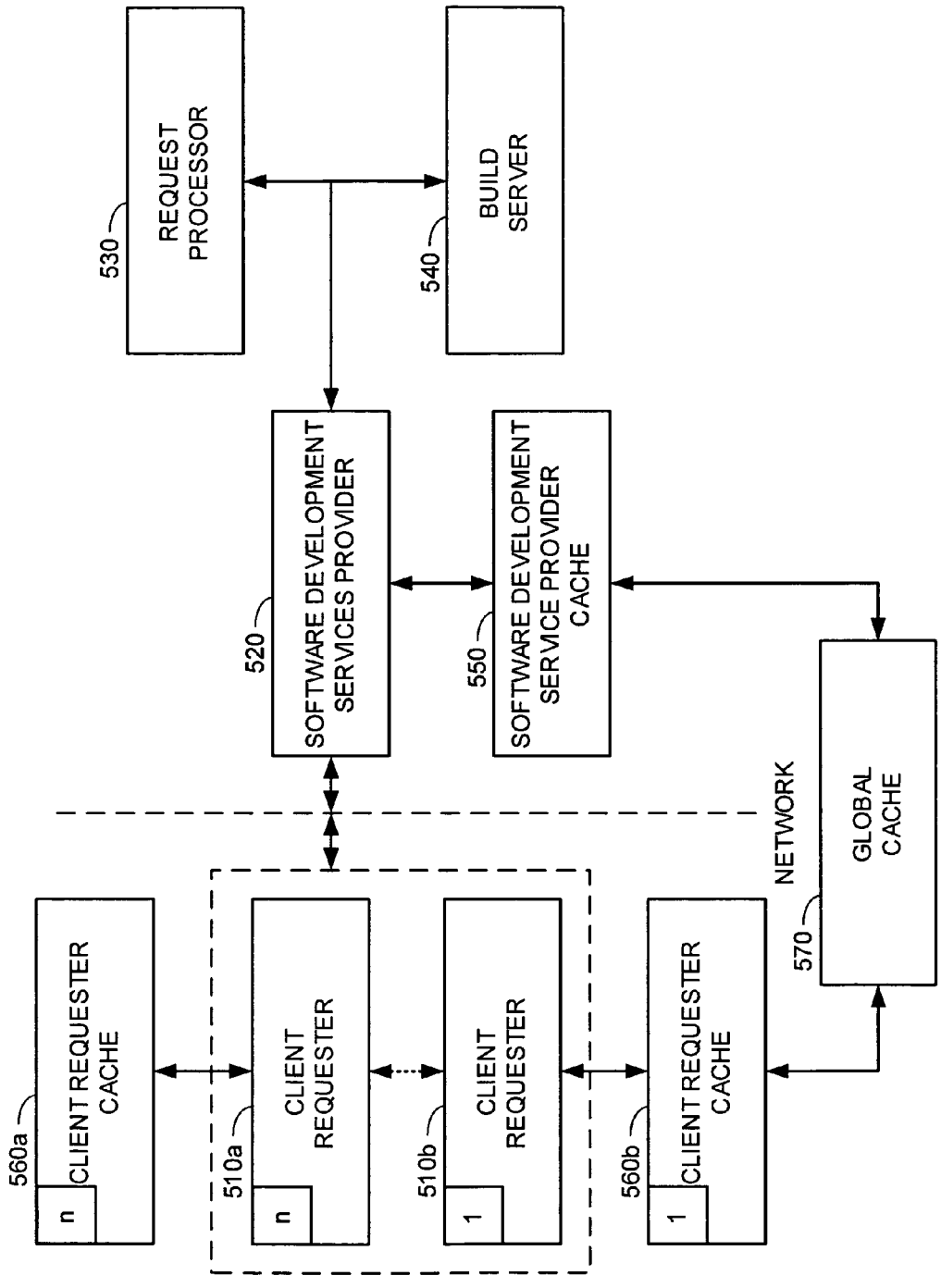
FIG. 5B is a block diagram at least in part illustrating an exemplary system for providing software development services over a network comprising an exemplary global memory location for storing input files and files related to processed results.

FIGS. 5A and 5B illustrate exemplary systems for providing software development tools in a network environment. In FIG. 5A, the system 500 comprises a network of client requesters 510 comprising one or more requesters (e.g., 510*a* and 510*b*) which are sources of high-level requests that prompt a response from the software development service provider 520. The client requesters (e.g., 510*a* and 510*b*) are responsible for building the requests and receiving and displaying responses, for instance. In one exemplary implementation, a web browser (e.g., Internet Explorer by Microsoft® Corporation) could be used to implement the user-interface for the client requester (e.g., 510*a* and 510*b*). The format of the request is described further in another section below. The software development service provider server 520 is the component responsible for receiving, coordinating the processing, and responding to requests from the client requester (e.g., 510*a* and 510*b*).

The main server 520 associated with the service provider is further communicative with a request processor component 530 which is desirably operable for analyzing the request and determining what responses are appropriate. For instance, based on previously processed requests, the request processor 530 generates one or more additional requests for generating results not specified and thus, not expected by the client requestor (e.g., 510*a* and 510*b*). These results include but are not limited to results from applying tools other than those specified originally by the requester or offering processing enhancements such as code fixes and security patches that the developer may not otherwise be aware of. The list of requests is then submitted to the provider server 520 and to the build server 540.

The build server component 540 is desirably responsible for building the response for the request by creating an appropriate execution environment, and running the software development tool with the specified input. The results of such executions of the software development tool are the results associated with the request. Such results can be those specified and thus, expected by a requestor (e.g., 150) and those not specified and thus, unexpected by a requestor (e.g., 160).

The service provider cache component 550 is responsible for intelligently caching request-response pairs. Thus, the system 500 is capable of determining whether a result for a particular request has been computed in the past and using the stored result in order to avoid re-computing the result. In one implementation, a table of result-response pairs is maintained in the provider cache 550, for instance.

An exemplary request is handled as follows:
1. A client request is sent to the request processor 530, which generates one-or-more additional requests.
2. For each request from the request processor 530, the provider cache 550 is consulted to determine if the result is already stored in the cache 550, in which case, it is retrieved.
3. For each request whose result is not stored in the provider cache 550, the build server 540 is invoked, whereby the result is generated by executing the appropriate tool in the specified environment. When the result is generated, it is stored in the provider cache 550 for future retrieval.

Those results that have been computed as results of the request are returned to the client requester (e.g., 510*a* and 510*b*) and also, stored in the client requester cache (e.g., 560*a* and 560*b*) for later retrieval. Thus, if and when another request is originated at a later time, the client side caches (e.g., 560*a* and 560*b*) are first examined to determine whether results for the request in question are stored thereon before incurring the transmission costs related to obtaining the results from the service provider.

As shown in FIG. 5B, in addition to having the provider cache 550 and the client side caches 560 *a-b*, a global cache or database at 570 may also be consulted to obtain the result for a particular request. This may be useful in allowing access to results generated by a third party.

The components described above with respect to their functionality illustrate one particular implementation. The various functionalities may be distributed differently among these and other components, not shown, without departing from the principles of the technology described herein. Also, the classification of a computer as a client (e.g., 510 *a-b*) or a server (e.g., 520, 530, 540 and 550) in the exemplary network described herein is for illustration purposes. Their roles are interchangeable. For instance, any of the functionalities described herein with reference to the server side of the network (e.g., 520, 530, 540 and 550) can also be implemented on the client (e.g., 510*a-b*) and vice versa.

Figure 6:
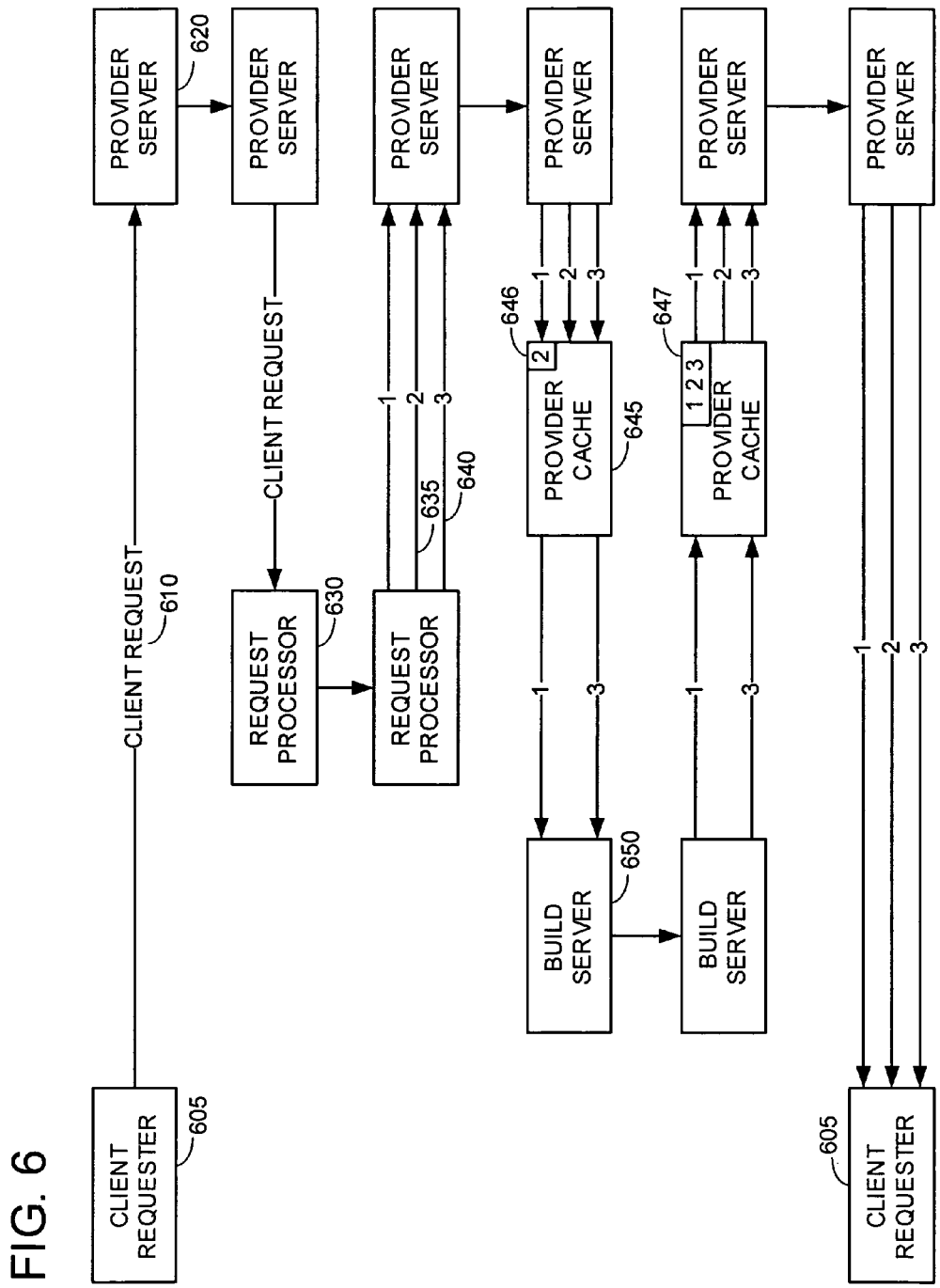
FIG. 6 is a block diagram illustrating a flow of events during an exemplary processing of an exemplary request for providing software development requests.

An Exemplary Processing of a Client Request for Software Development Services FIG. 6 illustrates how the various components of the system architecture described above interact to process a client request for software development services. The illustration shows the various exchanges of data between the components as time progresses. According to the example illustrated in FIG. 6, an initial client request at 610 is presented to the provider server at 620 and the request 610 is then submitted to the request processor 630 for processing. Based on the availability and the appropriateness of applying additional tools or additional processing, for instance, the request processor 630 generates two other requests 635 and 640. Later, it is determined that the provider cache 645 has stored within it results related to the second request at 646. Therefore, only requests 1 and 3 are passed on to the build server 650. Once the results related to requests 1 and 3 are computed by the build server 650, the results for requests 1, 2, and 3 are presented to the client requester 605. These results need not be presented to the client requester 605 simultaneously. Also, indicators of the results may first be presented to the client requester 605 prior to sending the actual results to the client to minimize the amount of data sent over the network. Furthermore, the results for the requests 1 and 3 may also be added to the provider cache at 647 in a manner suitable for later identification and retrieval. These methods are described in further detail below.

An Exemplary Method of Caching Service Request Results

In a client-server framework for providing software development services the provider server (520 of FIGS. 5A-B) may receive the same service requests from different requesters or the same request from the same source but at different times. Thus, it would be advantageous for the provider to maintain a record of the results to avoid re-computing the results each time the same request is received. Also, since at least some results may comprise a large amount of data, before a client requests the transmission of the contents of the results for a request it has generated, it would be beneficial to review a cache memory associated with it (e.g., 560*a* or 560*b*) to determine whether it already has such a result. In this manner, unnecessary transmission of data can be avoided. Thus, according to the method 700 of FIG. 7, information related to request-result pairs is stored in cache on both the server side (e.g., at 570 of FIG. 5B) and the client side (e.g., 560*a* or 560*b*) and these cache memory locations are consulted prior to computing and/or retrieving the results for each request to avoid unnecessary computations and unnecessary transmissions.

Figure 7:
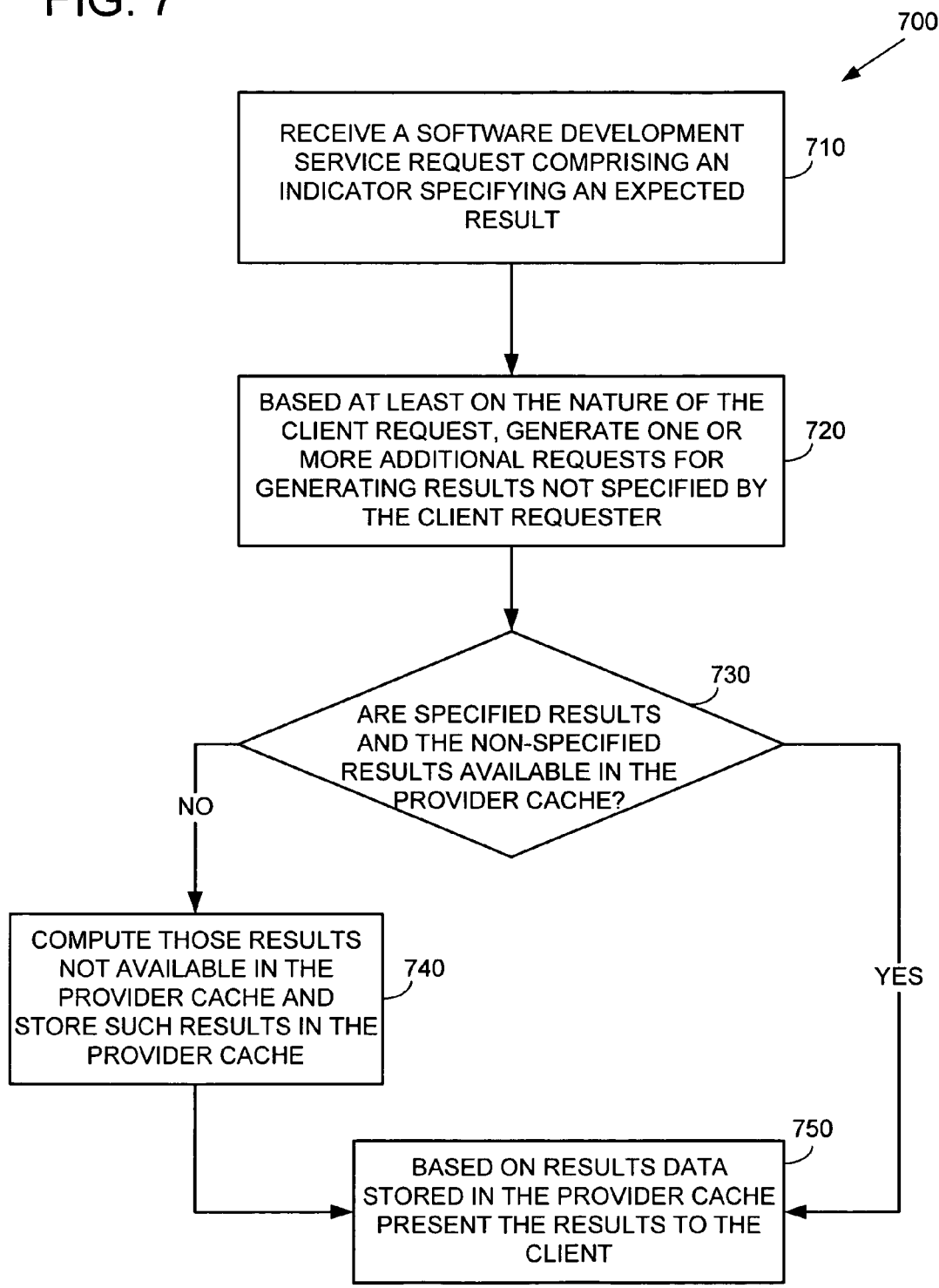
FIG. 7 is a flow diagram describing an exemplary method of providing software development services wherein cache memory locations (e.g., such as in FIGS. 5A-B) are used to avoid re-computing results for a software development service request by retrieving previously computed results.

An exemplary method 700 of maintaining such cache memories is described further with reference to FIG. 7. At 710, the provider server (520) receives a request. However, at 720, based at least on the nature of the request received by the client requester (e.g., 510*a* or 510*b*) the requester processor (530) may generate additional requests that it deems may be of interest to the developer. These additional requests when computed will yield results that are not specified by and thus, not expected (e.g., see 160 of FIG. 1) by the original requester (e.g., 510*a* or 510*b*). At 730, the provider server (520) examines the provider cache (550) to determine whether results related to any of the original requests and those generated by the request processor (530) are stored therein. At 740, those results not stored in the provider cache (550) are calculated and saved therein. Later at 750, the results specified by and thus, expected by the original requester (e.g., 510*a* or 510*b*), as well as the results not specified by and thus, not expected by the original requester (e.g., 510*a* or 510*b*), are presented to the original requester. If at 730, it is determined that all of the results (both expected and unexpected) are present in the provider cache (550) the computation step at 740 can be avoided.

Alternatively, a global memory location (e.g., 570 of FIG. 5B) with a repository of results related to software development service requests (e.g., 570 of FIG. 5B) may also be consulted in addition to or even in lieu of consulting the provider cache 550.

An Exemplary Interface for Interactions Between a Client Requester and a Software Development Service Provider An exemplary interface is provided as described below to allow the client requester (e.g., 510*a* or 510*b* of FIGS. 5A-B) to call the software development service provider server (520). The exemplary request interface is a method call that specifies an input file to be processed (e.g., foo.c) and a description of at least one specific result (e.g., foo.obj). Additionally, a description of a host environment or a context, which includes but is not limited to information such as environment variables, operating system version, registry settings, architecture specification, paths to include files in which the response will be computed from the request (e.g., x86, WinXPSP2, cl v8.1, path to headers, etc.) can also be specified in the call. A transformation rule that specifies how the result is computed from the input, such as *.c->*.o: cl &.c may also be specified. Additionally, the tool to be applied for generating the expected result is also specified. In the absence of the host environment or context, the provider server (520 of FIGS. 5A-B) will determine the host environment needed to compute the results.

A specific exemplary implementation of the client-server interface may be a single applicative interface as follows:
    code, outputs=apply (tool, arguments, inputs)
The variable "tool" names a software development tool (e.g., a C compiler); "arguments" is a list of strings that specify options to "tool" (e.g., environment or context in which to execute the tool); and "inputs" is a list of input files (e.g., C source and header files). The "apply" method returns two values, an exit code, and a list of output files. The value of "code" is used to indicate success or failure of the "apply" method. Outputs may include files that hold the standard output and standard error files from executing the tool, which usually contain diagnostics when tools fail.

An Exemplary Method of Identifying Files for Storage and Retrieval

Appropriate memory locations (e.g., 560*a-b* and 550) can be searched to avoid having to unnecessarily re-compute results of software development activities and/or to avoid unnecessary transmission of input files and/or files comprising results of software development service requests (e.g., between a client requester (e.g., 510*a* and 510*b* of FIGS. 5A-B) and a provider server (520)). In order to make such memory locations deterministically searchable, something other than, or in addition to, the conventional user-assigned files names are needed to identify the stored files. This is so, for instance, because user-assigned file names in two different client machines, and sometimes in the same client machine, can refer to different software artifacts and thus, undermining the accuracy of any searches. One exemplary method of naming or assigning identifiers to a file (e.g., input or output files of a service request) that unambiguously identifies the file is based on a content-based fingerprint of the file. One implementation of such an identifier is a triple based file identifier that comprises the following:

Triple=(alias, fingerprint, url)

Desirably, the file fingerprint is a unique content based hash (e.g., Rivest-MD5 or a SHA-1 class of algorithms for determining a fingerprint of the contents of the file can be used). Desirably, the url is a hyperlink to a memory location (e.g., in one of the cache memory locations 560*a-b*, 550, and 570) from which the file can be fetched, if needed. Desirably, the alias is a local name for the file which can be used when "tool" is invoked, so that a software development tool or other applications can refer to the files by conventional names instead of the typically longer triples. Because the contents of the files being identified are hashed, the triple becomes an identifier that is unique to the file. A suitable portion of the content on which to base the hash can be varied in accordance with the desired strength of the hash's uniqueness. Desirably, identical files will have identical hashes. Desirably, non-identical files can have an identical hash with a low probability of a match. To positively and unambiguously determine that a target file is the same as the expected file, the file fingerprint of the target file must equal the expected file fingerprint.

The alias and the url are additional components that provide additional convenience. With the url location, for instance, the output file related to a client request is accessible to a client. If the client determines, based on the file fingerprint that such a result is not available in its own cache, the client can access the output file through the url location. Thus, the use of url's avoids unnecessary transmission of files. The same applies to a provider server receiving a fingerprint identifying an input file to which it needs to apply a software development tool.

Alternatively, as needed, the alias and/or the url can be selectively excluded to form a file identifier, such as a tuple comprising a file fingerprint and an url location of the file, which is still a unique identifier of the file so long as the file fingerprint is retained. The inputs and outputs lists of a request are lists of such triples or tuples comprising the unique file fingerprint identifier, for instance. Both client and server caches (560 *a-b* and 550) can maintain one or more tables of files indexed by the triples or a portion thereof.

If the url is not part of a unique identifier of input or output files, for instance, by convention, it may be agreed that such files can be retrieved from a memory location (e.g., the global location 570) where the files are stored according to an index, based at least on their content based fingerprint. In another implementation, the url can be based at least in part on the file fingerprint.

Exemplary Methods of Avoiding Unnecessary Computation and Transmissions

Figure 8:
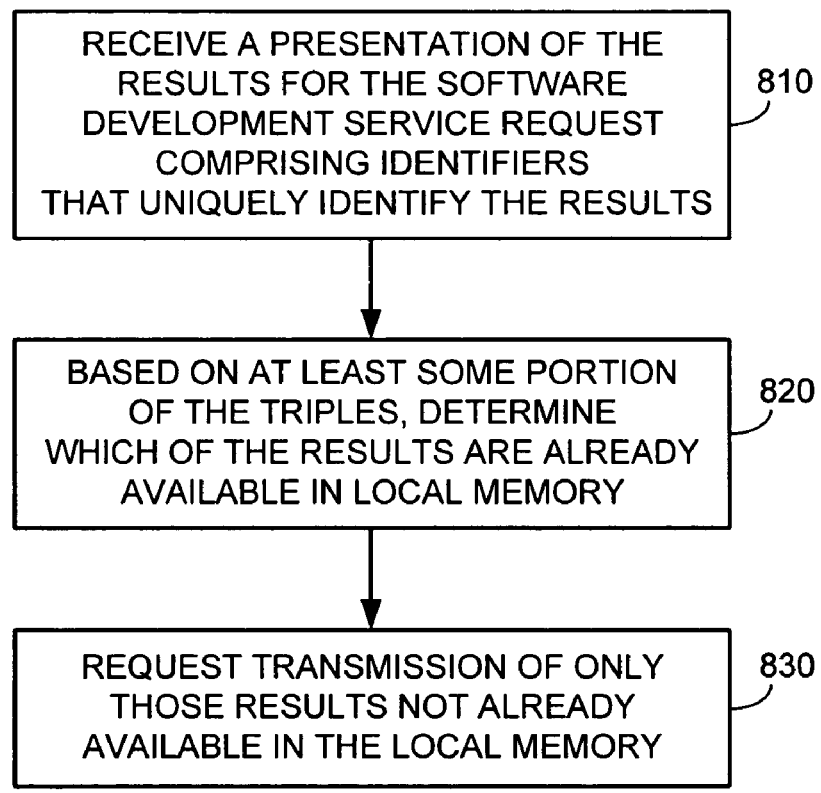
FIG. 8 is a flow diagram describing an exemplary method of avoiding unnecessary transmissions when retrieving results of a request for software development services.

To avoid unnecessary downloads of results, for instance, as described in FIG. 8, the client requester (e.g., 510*a* or 510*b* of FIGS. 5A-B) at 810 receives a presentation of the results comprising one or more file identifiers comprising file fingerprints that correspondingly identify results related to requests. However, before downloading the files related to the results, at 820, based at least on some portion of the file identifiers, such as a fingerprint hash of the results, the client requester (e.g., 510*a* or 510*b*) will search the registry of the client cache (e.g., 560*b*) for the presence of the results. At 830, the client requests transmission of only those result files for which it does not find a match. In determining a match, the file fingerprint hash of the result files indicated by the service provider (520) has to match that of a file stored in the client cache (560*a-b*), which ensures that their contents are sufficiently the same. The level of confidence in this determination is adjustable to the extent that the strength of the content based hashing is also adjustable. Furthermore, files may initially be matched based on their alias and a match may later be confirmed by matching the file fingerprint hash of the files. Unnecessary transmission of content of input files for software development related processing can be also avoided in a similar manner by first transmitting the file identifier comprising the file fingerprint (e.g., the triple) of the input files.

A fingerprint hash of files can also be used to avoid unnecessary re-computation of results related to software development requests. In one implementation, a table of request-result pairs is maintained in a searchable memory location (e.g., 560*a-b*, 550, and 570) wherein the request-result pairs are uniquely identified based at least in part on a fingerprint of an input file specified in the processed request. For instance, a software development service request can specify one or more input files using a fingerprint hash of the input file. A specification of a software development tool and an execution environment for executing the software development tool can also be specified in the request. Thus, once results related to such requests are computed, they may be stored in memory (e.g., 560*a-b*, 550, and 570) in one or more tables indexed according to a unique mapping of the request-result pairs based at least on a fingerprint of the input files. In this manner, a later request that is similar to a previously processed request can be identified and its results can be retrieved from memory and thus, avoiding re-computation.

The unique request-result mapping may also be based on additional information related to the requests, such as the software development tools specified in the request. The specification of a software development tool can also include a specification of an execution environment for executing the tool. Alternatively, different tables can be maintained for different tools and thus, obviating the need for indexing the request-result pair mappings based on software development tools specified in a request.

Exemplary Methods of Avoiding Re-Computation Related to Software Development Activities on a Single Computer The unique file identifiers based on a content based file fingerprint (e.g., the file content hash, the triples or the tuples described herein) also can be used on a stand-alone machine to avoid re-computation of results related to software development activities, such as compilation. For instance, once a file identifier is used to uniquely identify and store the request-result pairs of software development activities (e.g., compilation), a later request for the same computation originating on the same machine on the same input file can be avoided by first searching an indexed table of stored results files of previous computations.

Exemplary Requests for Software Development Services

Requests for software developments services can be implemented in several forms. For instance, specification of the input files can include the actual files. Such specification of input files also can be in form of a unique identifier of the file, such as a content based file fingerprint. The specification can also include some indicator of a location of the file (e.g., an url). The location may be in a cache memory location local to the computer originating the request (e.g., 560a-b in FIG. 5A-B) and accessible to the target of the request. Such locations may also be elsewhere, such as in a global location accessible to other computers on the network (e.g., 570 in FIG. 5B). The request can also include some combination of the file identifier (e.g., a file fingerprint), the file location indicator (e.g., url) and the actual file.

Exemplary Processing and Presentation of Results Related to Requests for Software Development Services Re-computation of results can be avoided by verifying whether a particular request was previously processed. Results can be presented to a requester in several forms. For instance, the actual result files can be presented to the requester. Alternatively, an identifier of the result files (e.g., file fingerprint) can be presented so that the requester can determine whether the transmission of the results files is necessary. Some indicator of a location of the result file also can be presented. The location can be in a local cache (e.g., 550 of FIGS. 5A-B) or even at a global location (e.g., 570 of FIG. 5B). Results computed for the first time are stored in one of these memory locations to be accessed later to avoid re-computation. Results may also be presented as some combination of the actual results, identifiers of the result files (e.g., file fingerprint), and an indicator of the location of the results files.

An Exemplary Illustration of Processing of an Input File According to a Software Development Service Request Here is a simple example of processing of a request for compilation services related to a C language source code file that illustrates the interaction between a client requester (e.g., 510a or 510b of FIG. 5), a provider server (520), their caches (e.g., 560a-b and 550), and files stored therein. The following three files in Table 1 implement the typical "hello world" program in the programming language C.

TABLE 1

```
hello.h:
extern void hello(char *);
hello.c:
#include "hello.h"
#include <stdio.h>
void hello(char *msg) {
    printf(msg);
}
main.c:
#include "hello.h"
void main(void) {
    hello("hello world\n");
}
```

A client requester (e.g., 510a or 510b), running on a machine named "drh2" issues a call to the provider server as shown in table 2, below.

TABLE 2

```
apply(cc,
[ '-c' ]
[ ('hello.c', 'ee1dd4f2dd9548d63864805bc94c10f5',
        'http://drh2/client/cache/
        ee1dd4f2dd9548d63864805bc94c10f5.content'),
  ('hello.h', '3cece125588265fa53eaab115db709bd',
        'http://drh2/client/cache/
        3cece125588265fa53eaab115db709bd.content')
] )
```

Generally, the call in table 2 requests results of compilation by a C complier of input files "hello.c" and "hello.h." Square brackets denote lists. Argument is the one-element list holding a parameter "-c" which is passed to the specified tool "cc" to indicate that the software development service requested relates to producing a compiled object file ".obj", for instance. The urls in the input triples point directly to the files in the client's cache (e.g., 560a-b). So, for instance, if the server does not already have the input file identified by the file fingerprint hash "ee1dd4f2dd9548d63864805bc94c10f5," it fetches it from the location identified by the locator "http://drh2/client/cache/ee1dd4f2dd9548d63864805bc94c10f5.content". Such locations may also be a third party administered global location (e.g., 570 of FIG. 5B), as well as ones directly associated with the client requester (e.g., 560a-b). The software development tool specified here (C compiler "cc") is invoked with the input files, including "hello.h" in this example, because the server may not be aware of all of the tool-specific details, such as any include files. In this instance, the provider server (520) retrieves the input files from the client cache (e.g., 560a-b) and stores it in its own cache and invokes the software development tool with the arguments and the input files, as specified in the request.

For this example, the outputs list returned by the provider server (520) is as shown in table 3, below.

TABLE 3

```
[('.stderr', 'd41d8cd98f00b204e9800998ecf8427e',
        'http://pls-ts/lathe/server/cache/
        d41d8cd98f00b204e9800998ecf8427e.content'),
 ('.stdout', '62a2757d4f65f2786daae0134994746a',
        'http://pls-ts/lathe/server/cache/
        62a2757d4f65f2786daae0134994746a.content'),
 ('hello.obj', '23a1ad20c3ea5fe71179bc76dcaab433',
        'http://pls-ts/lathe/server/cache/
        23a1ad20c3ea5fe71179bc76dcaab433.content')]
```

Referring to table 3 above, the first two files hold the standard error and standard output from the command, and the third holds the object code generated for the "hello.c" input file. The urls point to files in the server's cache, which resides on a machine named "pls-ts." The client requester (e.g., 510 *a* or *b*) can fetch the files from the given urls, if necessary, and copy the first two files to its own cache (e.g., 560a-b). When the command completes, there is a "hello.obj" file in client cache (e.g., 560a-b) just as if the "hello.c" was compiled locally at the client.

The following table 4 lists three service requests that together request the build of an executable file corresponding to the compiled "hello.c" as "hello.exe," interleaved with the file transfers from the client requester (e.g., 510 *a-b*) to the provider server (520) indicated by ">>" and vice versa indicated by "<<." This exemplary trace below in table 4 omits the urls from the file fingerprint transfers, for simplicity.

TABLE 4

```
cc -c hello.c hello.h
    >>hello.c ee1dd4f2dd9548d63864805bc94c10f5
    >>hello.h 3cece125588265fa53eaab115db709bd
    <<.stderr d41d8cd98f00b204e9800998ecf8427e
    <<.stdout 62a2757d4f65f2786daae0134994746a
    <<hello.obj d7f8c3b28f10eec6d4d8d3cd8766c7bc
hello.c
cc -c main.c hello.h
    >>main.c 3f456f4b65a27be3e26ecaeb7ec9ca47
    <<.stdout 7e7cb3e5e364ea6193ecd7f69a610661
    <<main.obj 753a650306f0a979a0e12e9e9cf39794
main.c
cc -out:hello.exe main.obj hello.obj
    <<hello.exe f23c1f065232492bb0e03f30129562b4
```

Referring to table 4, once the "hello.c" file is compiled to generate "hello.obj," both the client requester (e.g., 510 *a* or *b*) and the provider server (520) start using cached files. Thus, when "main.c" is compiled later, as above in table 4, the provider server (520) already has "hello.h," so it is not transferred from the client requester (e.g., 510 *a* or *b*). Likewise, the client requester (e.g., 510 *a* or *b*) already has the standard error file (which is empty). Further, below for the third command "cc-out:hello.exe main.obj hello.obj" in table 4, the server has what it needs to link the two object files "hello.obj" and "main.obj" so it fetches nothing. Both the standard error and output from the third command "cc-out:hello.exe main.obj hello.obj" are empty, and the client already has an empty file from the first command "cc-c hello.c hello.h." This example above is built in steps to illustrate the interaction between the client requester (e.g., 510 *a* or *b*) and the provider server (520), but the program can be built with a single command, as shown below in table 5.

TABLE 5

```
cc -out:hello.exe main.c hello.c hello.h
    <<.stdout e32602d50f315b6e62e9485191b10f9f
    <<hello.exe 341f2da379fa2230c8b29ab9f58374cb
    <<hello.obj 55e90f19d2473259dcc14fb5eacc354a
    <<main.obj cc935d7ea574a454049e9da3b868fe1d
main.c
hello.c
Generating Code...
```

The client requester (e.g., 510 *a-b*) and provider server (520) may already have suitable copies of "hello.exe," "hello.obj," and "main.obj," so this request "cc-out:hello.exe main.c hello.c hello.h" above in table 5 coming after the requests in table 4 should cause just the standard output ".stdout" to actually be transmitted.

The software development requests are applicative. Thus, given a set of arguments and inputs, a tool always returns the same outputs. The server saves results of the requests and returns these saved results whenever possible. Clients requesting services cannot determine if the results they receive are from a previous or a new invocation of a request for software development service. Also, if the same results had been transmitted to the requesting client previously, then the results are not re-transmitted. Instead, just an indication of the previous transmission may be sent back as a response to the request. For example, table 6 below displays the results of re-executing the command "cc-out:hello.exe main.c hello.c hello.h."

TABLE 6

```
cc -out:hello.exe main.c hello.c hello.h
main.c
hello.c
Generating Code...
```

Here, the requesting client already has these outputs as results from the previous computation (e.g., at table 5), so nothing is transferred.

The order of the arguments and inputs matter when the server looks for saved results, and the file fingerprints in the input triples are used for matching the request-result pairs. For instance, the arguments and inputs from the command above "cc-out:hello.exe main.c hello.c hello.h" in table 5 and table 6 are reduced as shown in table 7, below.

TABLE 7

```
cc
-out:hello.exe
3f456f4b65a27be3e26ecaeb7ec9ca47
ee1dd4f2dd9548d63864805bc94c10f5
3cece125588265fa53eaab115db709bd
```

In this example, the server saves only the alias and file fingerprints from the outputs, e.g., for this example, it saves ".stderr," ".stdout," "hello.exe," "hello.obj," and "main.obj" as shown in table 8, below.

TABLE 8

```
.stderr d41d8cd98f00b204e9800998ecf8427e
.stdout e32602d50f315b6e62e9485191b10f9f
hello.exe 341f2da379fa2230c8b29ab9f58374cb
hello.obj 55e90f19d2473259dcc14fb5eacc354a
```

TABLE 8

```
main.obj cc 935d7ea574a454049e9da3b868fe1d
```

The provider server need not save the results for commands that fail, (e.g., those that return a nonzero result for "code" in the apply method, described above) on the assumption that failure may be a result of external factors. The worst-case effect of this approach is that commands that fail are re-executed. Client requesters and provider server save the files that appear in the inputs and outputs, so re-invoking a tool or invoking a tool with the arguments or inputs in a different order often results in no file transfers.

Using applicative tools and saving invocation results makes it unnecessary to use timestamps to avoid doing redundant work in build scripts. A script can be executed from top to bottom—only the tool invocations that are needed are actually executed.

An Exemplary Reproducible Build Service

Re-computing results related to software development services can be avoided by appropriately naming and retrieving results related to specific service requests. In order to rely on results saved in cache memories (e.g., 560*a-b* and 550) it is essential to ensure that the result would have been the same whether it was re-computed or retrieved from a cache memory. However, each instance of applying a software development tool (by different computers or at different times by the same computers) yields different results. Thus, application of software development tools is not predictably and dependably reproducible. The problem of lack of reproducibility in applying software tools occurs because the software tools are complex applications themselves that have many explicit and implicit dependencies on the hardware and software context in which they run. Software context includes but is not limited to such information as, the operating system version, what other applications have been installed on the computer executing the tool, what registry entries exist at the time the tool is used, what security patches have been installed, and what user environment variables exist and what their values are.

Such software execution context is quite expansive and very difficult to fully enumerate explicitly. Each developer may execute a compiler in a different context, for instance. A developer compiling a file on one machine may generate a different object file than a developer compiling the same file on a different machine. Even worse, the same developer may get a different result compiling the same file on the same machine just at a later time (e.g., after a new software has been installed or a security patch installed). For instance, a compiler may vary the algorithm it uses to generate code based on the amount of physical memory present in the machine in which it runs or it may choose to vary the algorithm based on the amount of virtual memory currently available to the process (a quantity that is constantly changing over time).

A common practice among software developers is called a "buddy build" where a developer asks a fellow developer to build the software they have written on their machine to identify potentially unknown dependencies on the system context in which the software was originally developed. This ad hoc approach to identifying implicit dependencies consumes an inordinate amount of time and computing resources, and yet doing a buddy build remains a common practice throughout the software industry.

As described herein are methods and systems that ensure that an execution context in one computer at a particular time can be captured and saved. Once saved, it can be replicated in as many other computers at any other time or at the same computer at a later time to ensure that differences in the execution contexts is not a factor in determining the results of executing any software. In the context of the methods and systems for providing software development services, it ensures that saved results for service requests, once computed on a computer with an execution environment that is specified, can be ensured to be the same as if it was re-computed.

Suppose a repository exists (e.g., a source code depot) that can be used to store software artifacts with associated version information. A standard file system could be used as the repository. Further suppose that software tools exist that take software artifacts as inputs and produce software artifacts as results and that they are deterministic, that is, given the same exact hardware and software context and the same inputs, they will produce the same result.

To create a reproducible software execution context for software development tools a Virtual Machine Monitor (VMM), such as the Virtual PC by Microsoft Corporation, and the VMware Workstation by EMC Corporation can be used. These VMMs provide for invoking one or more software virtual machines that, among other things, emulate an underlying hardware. Thus, using such VMMs, multiple virtual machines running multiple different execution contexts, including different operating systems, can be implemented. These VMMs (sometimes also referred to as hypervisors) allow for the capability of specifying the type and versions of operating systems and applications, including software development tools that can be installed onto any virtual machine associated therewith.

Also, once such virtual machines are created, an image of the installation, including the specific execution context, can be saved as a file. In Virtual PC, a product by Microsoft Corporation, this is called a Virtual Hard Disk (VHD). At some later time, the exact state of the original saved virtual machine context can be recreated from the saved VHD file by the VMMs.

The VHD file, like any other file in a file system, can be stored in the repository that stores other software artifacts. For instance, a VHD can be saved in any of the cache memories (e.g., 560*a-b* and 550 of FIG. 5A-B) that also stores input files and result files associated with requests for software development services.

To provide a high degree of reproducibility, VHDs should exactly capture the entire context of a software tool and invoke the tool in a completely clean virtual machine every time it is used. A new tool for software development is installed by first installing a desired operating system and later installing the desired tool to create the tool VHD. This tool VHD file is then stored in an associated memory for later use. To invoke a given tool, its tool VHD file is accessed from the memory and installed on a VMM. This creates a tool context that is identical every time the tool is invoked. To execute the tool, the necessary inputs are passed to the VMM via a network connection to the host computer, for instance. The tool processes any input files creating results which are passed back to the host computer, which are eventually stored in memory. If executing the tool in the defined, context the VMM has additional side effects, these side effects can be discarded (e.g., Virtual PC, the undo disk is discarded), and the next time the tool is invoked the original tool VHD will be used again. All results of executing tools are explicitly passed out to the host computer after the tool executes.

Figure 9:
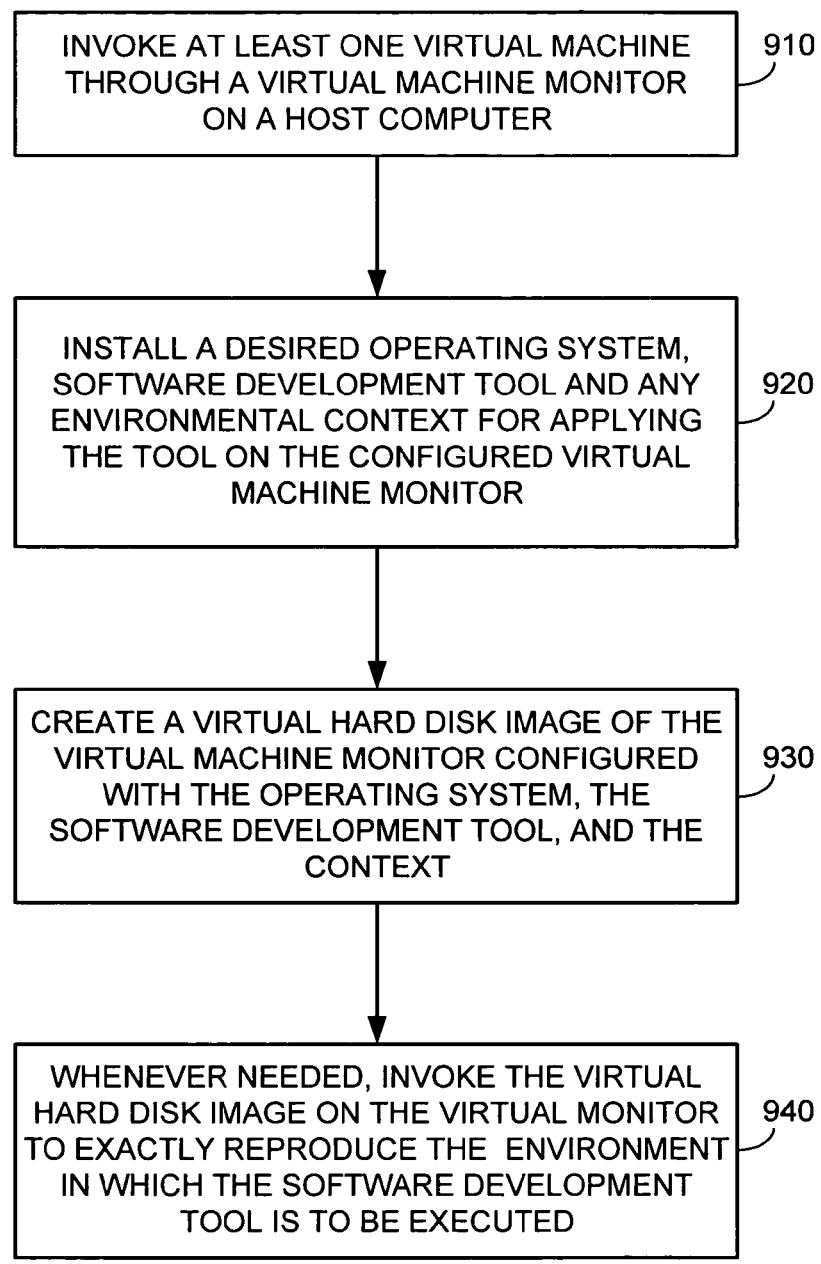
FIG. 9 is a flow diagram describing an exemplary method of generating a reproducible environment for executing software.

FIG. 9 illustrates an overall method 900 for creating and using the reproducible execution context for executing software. At 910, at least one virtual machine is launched through a VMM. Then at 920, a specific context for the virtual machine is created by installing the operating system and the software development tool to be executed on the machine. Later, at 930, an image (e.g., virtual hard disk in the Virtual PC) of the virtual machine as configured is saved. Thus, at 940, any time later when the software development tool is used to process an input file, the saved image of the execution context (e.g., VHD in Virtual PC) is invoked to recreate the exact context.

A further advantage of using the saved image file of the execution context (e.g., VHD) is that such a file also becomes an artifact that the cache memories (e.g., 560*a-b* and 550 of FIGS. 5A-B) can store along with other artifacts (e.g., source files, object files, etc.). As such, the image of the execution context (e.g., VHD) can be stored using a triple for unambiguously identifying it and for later invoking such stored execution context when needed. Furthermore, in the software development services context, for instance, the triple identifying the image of the execution context can be provided as one of the arguments for a call by a client requester (e.g., 510 *a-b* of FIG. 5 A-B) to a service provider server (520). This ensures that the result of the processing, if computed for the first time, is as specified in a known execution context and thus, also implicitly ensuring that if the result is provided from the saved result that result too is the same as if it was computed for the first time.

Although, the methods and systems for generating reproducible execution environments are described with reference to providing software development services over the network, the principles described therein are not limited to that particular context. In fact, even on a stand-alone machine, execution environments can be reproduced exactly as described above to avoid any potential inconsistencies between execution environments on the same machine at different times. In fact, using the methods and systems described above, a final build for bringing together components of a software program can be implemented on a VMM with a specific VHD. In this manner, the various components developed and initially compiled and tested in different computers and different times can be verified within a known execution context.

Exemplary Computing Environment

Figure 10:
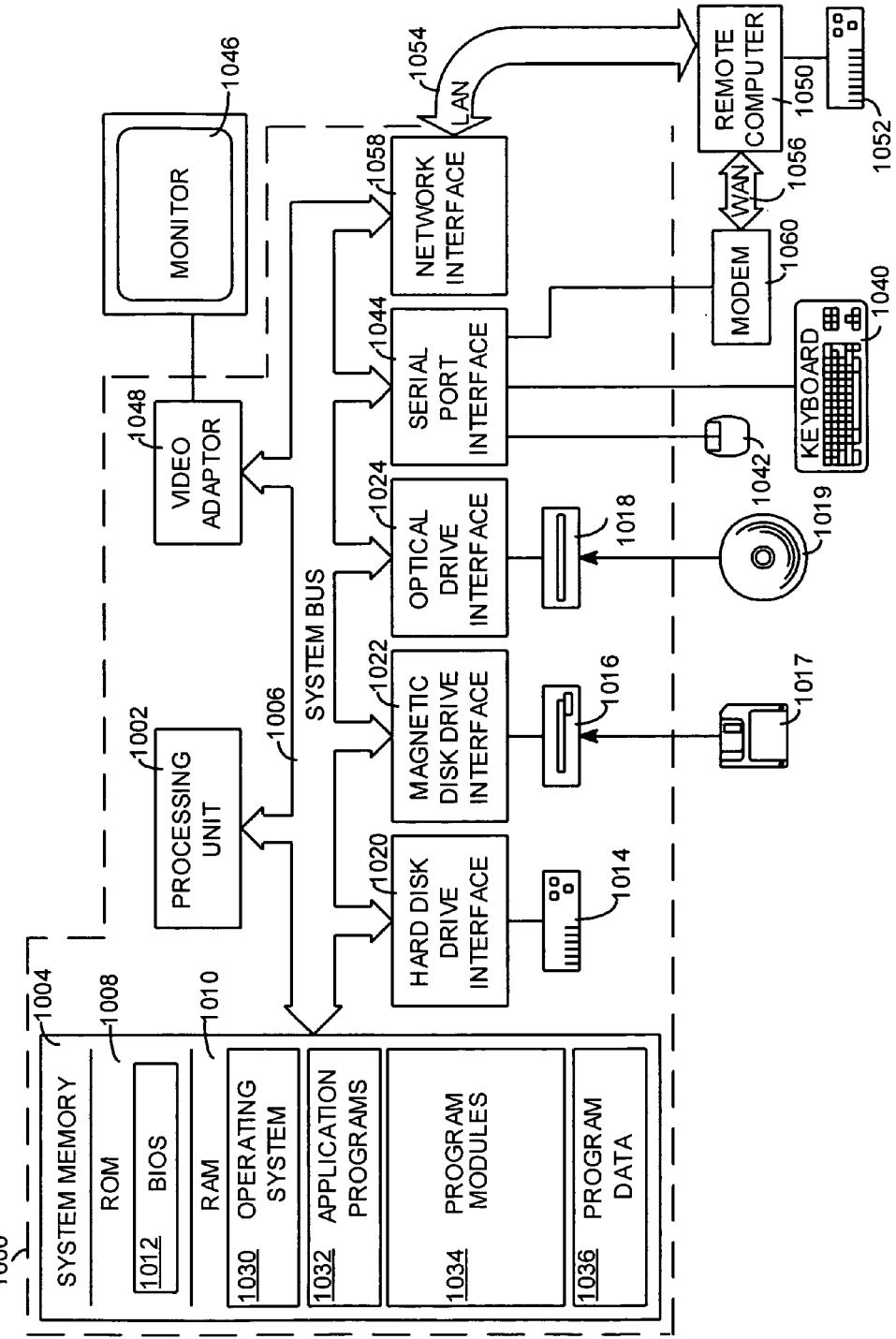
FIG. 10 is a block diagram depicting a general-purpose computing device constituting an exemplary system for implementing the disclosed technology.

FIG. 10 and the following discussion are intended to provide a brief, general description of an exemplary computing environment in which the disclosed technology may be implemented. For instance, any of the functionalities described with respect to client requesters (e.g., 510a-b), provider servers (520) and VMMs can be implemented in such a computing environment. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, an exemplary system for implementing the disclosed technology includes a general purpose computing device in the form of a conventional PC 1000, including a processing unit 1002, a system memory 1004, and a system bus 1006 that couples various system components including the system memory 1004 to the processing unit 1002. The system bus 1006 may be any of several types of bus structures including a memory bus or memory controller, a peripheral bus, and a local bus using any of a variety of bus architectures. The system memory 1004 includes read only memory (ROM) 1008 and random access memory (RAM) 1010. A basic input/output system (BIOS) 1012, containing the basic routines that help with the transfer of information between elements within the PC 1000, is stored in ROM 1008.

The PC 1000 further includes a hard disk drive 1014 for reading from and writing to a hard disk (not shown), a magnetic disk drive 1016 for reading from or writing to a removable magnetic disk 1017, and an optical disk drive 1018 for reading from or writing to a removable optical disk 1019 (such as a CD-ROM or other optical media). The hard disk drive 1014, magnetic disk drive 1016, and optical disk drive 1018 are connected to the system bus 1006 by a hard disk drive interface 1020, a magnetic disk drive interface 1022, and an optical drive interface 1024, respectively. The drives and their associated computer-readable media provide nonvolatile storage of computer-readable instructions, data structures, program modules, and other data for the PC 1000. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk 1014, magnetic disk 1017, optical disk 1019, ROM 1008, or RAM 1010, including an operating system 1030, one or more application programs 1032, other program modules 1034, and program data 1036. For instance, one or more files comprising instructions related to performing the methods of storing and retrieving, and delivering results related to software development services as described herein may be among the program modules 1034. A user may enter commands and information into the PC 1000 through input devices, such as a keyboard 1040 and pointing device 1042 (such as a mouse). Other input devices (not shown) may include a digital camera, microphone, joystick, game pad, satellite dish, scanner, or the like. These and other input devices are often connected to the processing unit 1002 through a serial port interface 1044 that is coupled to the system bus 1006, but may be connected by other interfaces, such as a parallel port, game port, or universal serial bus (USB) (none of which are shown). A monitor 1046 or other type of display device is also connected to the system bus 1006 via an interface, such as a video adapter 1048. Other peripheral output devices, such as speakers and printers (not shown), may be included.

The PC 1000 may operate in a networked environment using logical connections to one or more remote computers, such as a remote computer 1050. The remote computer 1050 may be another PC, a server, a router, a network PC, or a peer device or other common network node, and typically includes many or all of the elements described above relative to the PC 1000, although only a memory storage device 1052 has been illustrated in FIG. 10. The logical connections depicted in FIG. 10 include a local area network (LAN) 1054 and a wide area network (WAN) 1056. Such networking environments are commonplace in offices, enterprise-wide computer networks, intranets, and the Internet.

When used in a LAN networking environment, the PC 1000 is connected to the LAN 1054 through a network interface 1058. When used in a WAN networking environment, the PC 1000 typically includes a modem 1060 or other means for establishing communications over the WAN 1056, such as the Internet. The modem 1060, which may be internal or external, is connected to the system bus 1006 via the serial port interface 1044. In a networked environment, program modules depicted relative to the personal computer 1000, or portions thereof, may be stored in the remote memory storage device 1052. The network connections shown are exemplary, and other means of establishing a communications link between the computers may be used.

Alternatives

Having described and illustrated the principles of our invention with reference to the illustrated embodiments, it will be recognized that the illustrated embodiments can be modified in arrangement and detail without departing from such principles. For instance, the functionality of the various components of the software development services network described herein can be distributed differently among the components or other components not shown.

Elements of the illustrated embodiment shown in software may be implemented in hardware and vice versa. Also, the technologies from any example can be combined with the technologies described in any one or more of the other examples.

In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We, therefore, claim as our invention all subject matter that comes within the scope and spirit of these claims.

We claim:

1. A computer implemented method of processing software development service requests, the method comprising:
   receiving one or more requests for software development services, including a request for compilation of source code; and
   electronically returning at least two computed results, including a first compiled object code associated with the source code and a second compiled object code associated with the source code, the first compiled object code satisfying the request for compilation of the source code, the second compiled object code having been compiled by applying an analyzer or optimizer, which was not part of the request for compilation of source code and was not applied to the first compiled object code, so that the first compiled object code and the second compiled object code are at least two alternative compiled object codes, which are provided as the computed results in response to the request for compilation of source code.

2. The method of claim 1 further comprising:
   determining whether the first compiled object code or the second compiled object code are stored in one or more local cache memory locations;
   if the first compiled object code or the second compiled object code are located in the one or more local cache memory locations, using the locally stored object code as one of the computed results;
   if the first compiled object code or the second compiled object code are not located in the one or more local cache memory locations, then computing the first or second compiled object code and storing the computed results in the one or more local cache memory locations.

3. The method of claim 2, wherein the computed results are stored in the one or more local cache memory locations using a file identifier triple.

4. The method of claim 3, wherein the file identifier triple comprises at least one file fingerprint based at least in part on a content based hash of the computed result and an indicator for indicating a storage location of the computed result, which includes a uniform resource locator, and an alias which is a local name for the file and is unrelated to the content based hash.

5. The method of claim 1, wherein a server computer receives the one or more requests for software development services from a client computer through a network.

6. The method of claim 5, further including searching for the results in a cache memory location, wherein the cache memory location is a global memory location assessable by both the client computer and the server computer.

7. The method of claim 1, further including searching local cache memory for the results and computing the results for any result not available in the local cache memory.

8. The method of claim 7, wherein searching includes using a hash and based on the strength of the hash, matching the request to previously computed results.

9. One or more computer readable media providing non-volatile storage having instructions thereon that, when executed, cause a computer to perform a method comprising:
   receiving one or more requests for software development services, including a request for compilation of source code; and
   electronically returning at least two computed results, including a first compiled object code associated with the source code and a second compiled object code associated with the source code, the first compiled object code satisfying the request for compilation of the source code, the second compiled object code having been compiled by applying an analyzer or optimizer, which was not part of the request for compilation of source code and was not applied to the first compiled object code, so that the first compiled code and the second compiled object code are at least two alternative compiled object codes, which are provided in response to the request for compilation of source code.

10. The computer readable media of claim 9 further comprising:
    determining whether the first compiled object code or the second compiled object code are stored in one or more local cache memory locations;
    if the first compiled object code or the second compiled object code are located in the one or more local cache memory locations, using the locally stored object code as one of the computed results;
    if the first compiled object code or the second compiled object code are not located in the one or more local cache memory locations, then computing the first or second compiled object code and storing the computed results in the one or more local cache memory locations.

11. The computer readable media of claim 10, wherein the computed results are stored in the one or more local cache memory locations using a file identifier triple.

12. The computer readable media of claim 11, wherein the file identifier triple comprises at least one file fingerprint based at least in part on a content based hash of the computed result and an indicator for indicating a storage location of the computed result, which includes a uniform resource locator, and an alias which is a local name for the file and is unrelated to the content based hash.

13. The computer readable media of claim 10, wherein a server computer receives the one or more requests for software development services from a client computer through a network.

14. The computer readable media of claim 13, further including searching for the results in a cache memory location, wherein the cache memory location is a global memory location assessable by both the client computer and the server computer.

15. The computer readable media of claim 10, further including searching local cache memory for the results and computing the results for any result not available in the local cache memory.

16. The computer readable media of claim 15, wherein searching includes using a hash and based on the strength of the hash, matching the request to previously computed results.

* * * * *